Dec. 5, 1944.  A. Y. DODGE  2,364,280
ONE-WAY CLUTCH
Filed Jan. 21, 1944    2 Sheets-Sheet 1

Inventor:
Adiel Y. Dodge,
By Dawson, Ooms and Booth
Attorneys.

Dec. 5, 1944.  A. Y. DODGE  2,364,280
ONE-WAY CLUTCH
Filed Jan. 21, 1944  2 Sheets-Sheet 2
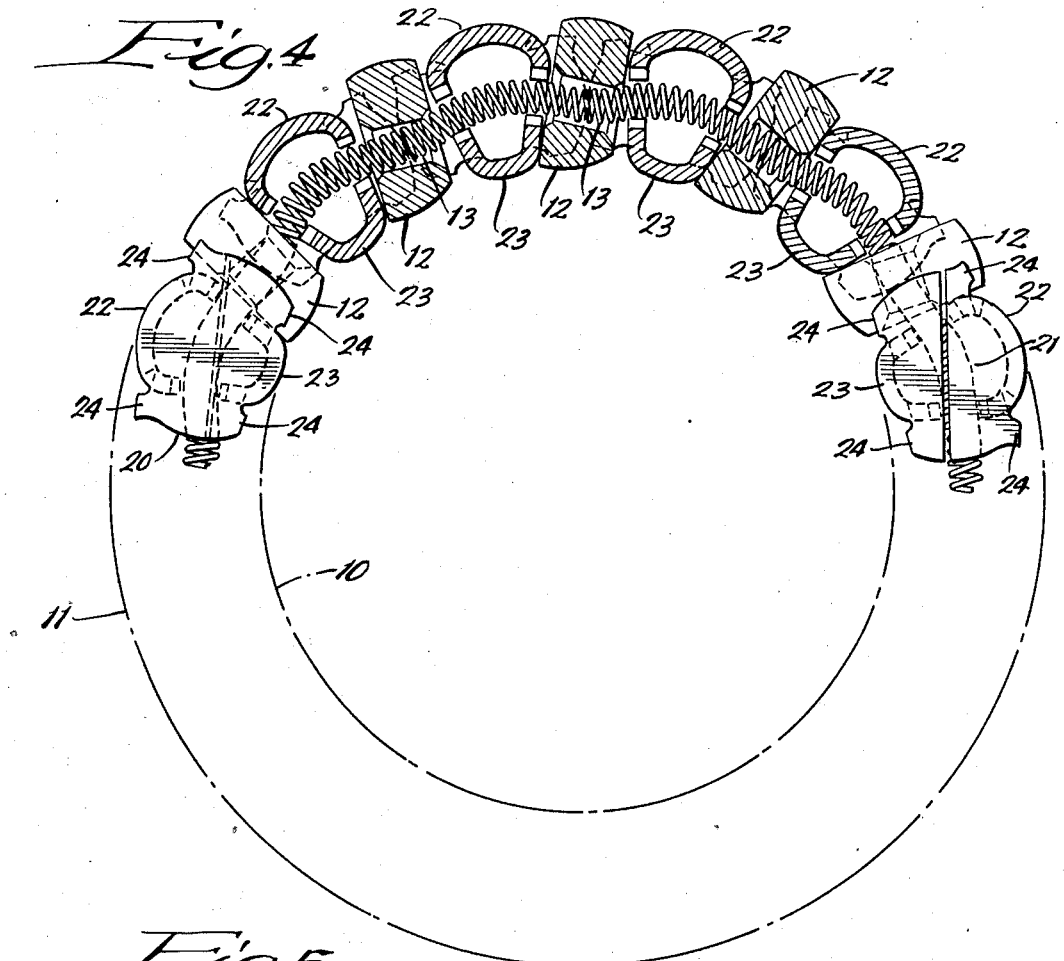
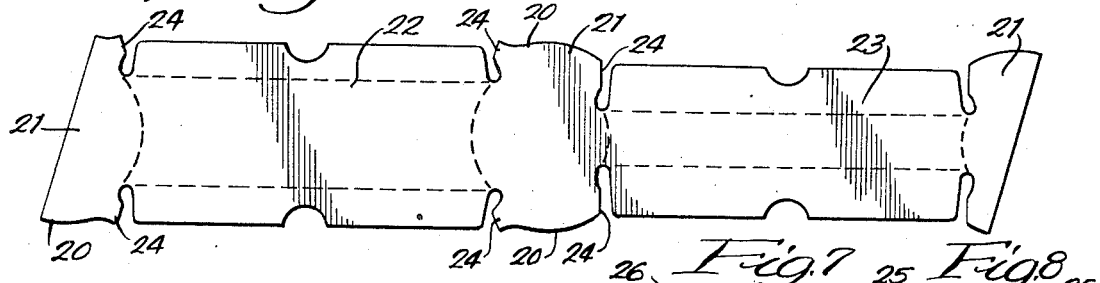
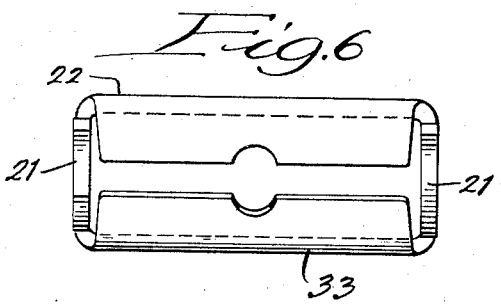
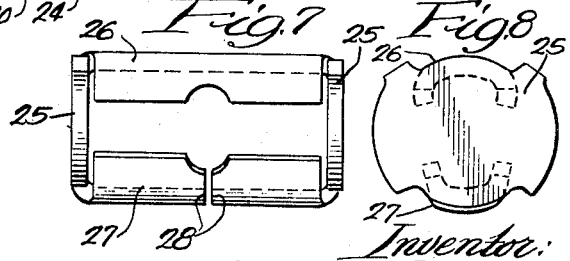
Inventor:
Adiel Y. Dodge,
By Dawson, Ooms & Borth
Attorneys.

Patented Dec. 5, 1944

2,364,280

UNITED STATES PATENT OFFICE 2,364,280

ONE-WAY CLUTCH

Adiel Y. Dodge, Rockford, Ill.

Application January 21, 1944, Serial No. 519,088

18 Claims. (Cl. 192—45.1)

This invention relates to a one-way clutch and more particularly to a clutch employing tiltable grippers without a cage.

Tiltable gripper type clutches have heretofore been proposed both with and without cages. For many installations and particularly where cost and size are important factors, clutches without cages are preferable. However, considerable difficulty has been encountered in maintaining the grippers properly spaced and positioned in the assembly and in properly controlling the grippers during operation. Furthermore, the assembly of the separate gripper and spacer elements where no cage is employed has been a tedious and difficult operation.

It is one of the objects of the present invention to provide a one-way clutch in which no cage is used and in which the grippers are held properly spaced and positioned in the assembly.

Another object of the invention is to provide a one-way clutch in which the grippers and spacers are supported on a flexible annular spring so that they can be handled as a unit. According to one important feature of this construction, the spring also constitutes a means for controlling tilting engagement of the grippers.

Still another object of the invention is to provide a one-way clutch in which the grippers are not moved in response to centrifugal force created by gyratory movements as, for example, when the clutch is used in a planetary assembly.

A further object of the invention is to provide a one-way clutch in which the grippers are held in place between the spacers by flanges on the ends of the spacers overlying the ends of the grippers. Such flanges preferably also serve to hold the spacers properly spaced apart in the assembly.

A still further object of the invention is to provide a one-way clutch in which the spacers control tilting of the grippers by frictional engagement of the spacers with the clutch races. Preferably the spacers are so formed as to resiliently engage the races to create a light friction thereon.

The above and other objects and advantages will be more readily apparent from the following description when read in connection with the accompanying drawings, in which—

Figure 4 is a view similar to Figure 1 of an alternative construction;

Figure 5 is a plan view of a blank employed in forming the spacers of Figure 4;

Figure 6 is a side elevation of a completed spacer;

Figure 7 is a side elevation of an alternative spacer construction; and

Figure 8 is an end elevation of the spacer of Figure 7.

Figure 1:
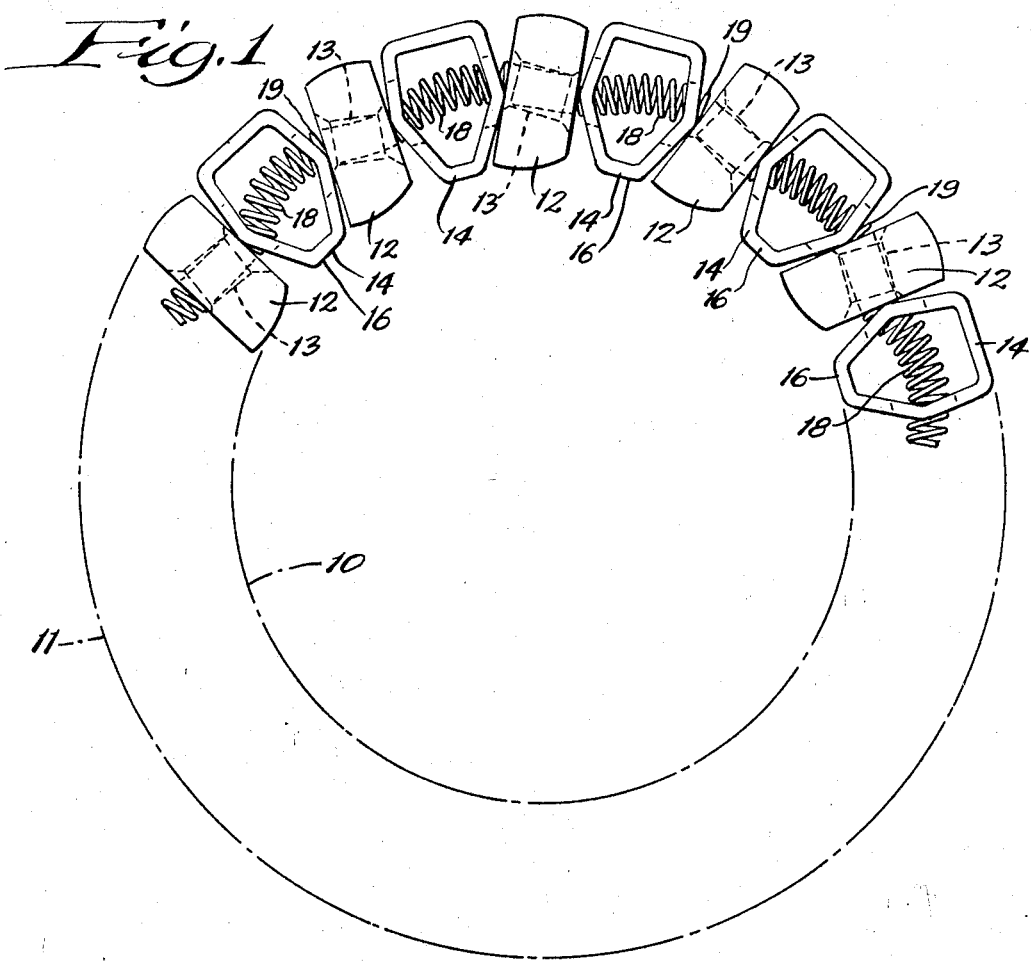
Figure 1 is a partial end elevation of one form of clutch embodying the invention.

The clutch as shown in Figure 1 is adapted to connect inner and outer races having coaxial cylindrical surfaces as indicated by the lines 10 and 11. The clutch includes a series of tiltable grippers 12 which may be constructed in the manner more particularly disclosed and claimed in my copending application, Serial No. 479,695, filed March 19, 1943. Each of the grippers is formed with a pair of spaced holes 13 therethrough lying at an angle slightly greater than a right angle to the face of the grippers to receive springs as hereinafter described.

Figure 2:
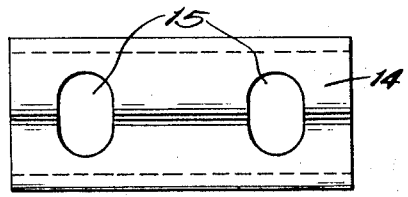
Figure 2 is a side elevation of one type of spacer employed.
Figure 3:
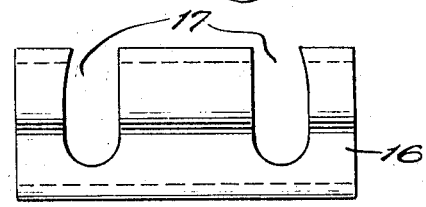
Figure 3 is a side elevation of another type of spacer.

The grippers are held spaced apart by a series of spacers 14 which may be hollow and formed of sheet metal and which are of diamond shape in cross section. The spacers may be formed in any suitabel manner as by bending sheets of metal to the desired shape and welding or otherwise fastening the edges together. The majority of the spacers is made up as shown in Figure 2 with spaced openings 15 therethrough registering when the parts are assembled with the openings 13 in the grippers. Certain of the spacers as shown at 16 are made up as illustrated in Figure 3 with slots 17 extending from one radial edge thereof past the center. Preferably only one or two spacers of this type are employed in each assembly to be placed on the spring after the other grippers and spacers have been assembled thereon and after the ends of the spring have been connected.

The several spacers and grippers are adapted to be threaded on springs illustrated as helical springs 18 with suitable spaces left for the special spacers 16. After the several spacers and grippers are assembled on the springs 18 the ends of the springs are connected as by threading them together to form complete annuli. After the springs are connected the special spacers 16 may be slipped into place by pressing the springs into the slots 17 therein to complete the assembly. Preferably the slots are formed with their sides converging slightly at the outer part of the spacers as shown so that the slots can be opened up during assembly and squeezed together to prevent accidental movement from the springs after they are assembled on the springs, and before locating between the races.

With the parts assembled as shown in Figure 1, it will be seen that the widest part of the spacers provides edges 19 engaging the grippers centrally of their radial width. With this construction any force between the spacers and grippers due to gyration of the clutch assembly will not exert a tilting force on the grippers. The springs, however, engage the openings 13 in the grippers in such a way that the springs are bent laterally and tend to tilt the grippers toward their engaging position. Thus the grippers will promptly engage the races to prevent clockwise rotation of the inner race relative to the outer race and will be tilted to disengaged position upon reversal of the direction of rotation. Two springs are preferably employed as indicated passing through spaced holes in the grippers and spacers to prevent relative turning of the grippers and spacers but it will be understood that more or less springs could be used, if desired.

Figures 3 to 6 illustrate an alternative construction of the spacers, the other parts in these figures corresponding to like parts in Figures 1 to 3 being indicated by the same reference numerals. In this construction the spacers are formed of sheet metal or the like shaped to provide end portions 21 connected by outer cross bars 22 and inner cross bars 23. The spacers may be made up from a blank such as shown in Figure 5 which is bent along the dotted lines indicated in the blank into the shape of Figure 6 to form a completed spacer.

The end portions 21 of the spacers terminate at their circumferential edges in arcuate positions indicated at 20 which are adapted to abut in the assembly to hold the spacers properly spaced apart. Due to the fact that these portions are arcuate about centers at the center of the end portions, they will maintain a constant spacing regardless of their angular position and may be so designed as just to fit in the space between the races.

The spacers are adapted to engage the races frictionally to be tilted in response to rotation of the races thereby to control the grippers. For this purpose, the inner cross bar 23 as best seen in Figure 6, is bowed outwardly at its center and the ends of the strip from which the spacer is formed are left spaced slightly apart at one of the end portions 21 as shown. With this construction the width of the spacer may be made slightly in excess of the radial distance between the races so that the cross bars 22 and 23 will press frictionally against the races.

With this construction when the inner race tends to turn clockwise relative to the outer race as seen in Figure 4, the spacers will be turned counter-clockwise by the friction drag of the races on the inner and outer cross bars. This will cause the inner cross bars to engage the inner ends of the adjacent grippers on the clockwise side thereof and the outer cross bars of the spacers to engage the outer ends of the grippers on the counter-clockwise side thereof to tilt the grippers into engagement with the races. Upon a reversal of the rotation of the races the spacers will be turned clockwise to reverse the operation described above and to tilt the grippers out of engagement with the races. Thus the grippers will respond rapidly to torque reversals and will be held out of engagement with the races during overrunning in response to the light friction drag of the spacers on the races.

Excessive tilting of the spacers during operation is prevented by forming the end portions 21 thereof with projecting ears 24 adapted to engage the races after a predetermined turning of the spacers. Thus during overrunning excessive turning of the spacers is prevented without interfering with the friction drag of the spacers on the races. Excessive tilting is also prevented by the grippers and spacers nesting solidly together at a predetermined angle.

An alternative construction of the spacers is illustrated in Figures 7 and 8 in which they are made up in much the same manner as in Figures 5 and 6 to provide enlarged flanged end portions 25 connected by outer cross bars 26 and inner cross bars 27. In forming spacers of this type the strip is so cut that its ends as indicated at 28 will lie in the central portion of the inner cross bar 27. The ends are preferably bowed out slightly to provide a light frictional engagement with the races. Except for this difference in construction the spacers of Figures 7 and 8 operate in the same manner as those of Figures 4 to 6.

While several embodiments of the invention have been shown and described in detail herein it will be understood that these are illustrative only and are not intended as definition of the scope of the invention, reference being had for this purpose to the appended claims.

What is claimed is:

1. A one-way clutch adapted to connect inner and outer coaxial races comprising a series of tiltable grippers, a series of spacers arranged alternately with the grippers, the spacers and grippers having openings therethrough, and an annular spring threaded through the openings in the spacers and grippers to hold them assembled.

2. A one-way clutch adapted to connect inner and outer coaxial races comprising a series of tiltable grippers, a series of spacers arranged alternately with the grippers, the spacers and grippers having openings therethrough, and an annular spring threaded through the openings in the spacers and grippers to hold them assembled, the openings through the grippers being of such a size and lying at such an angle as to bend the spring laterally whereby it will exert a tilting force on the grippers urging them into a position to engage the races.

3. A one-way clutch adapted to connect inner and outer coaxial races comprising a series of tiltable grippers, a series of spacers arranged alternately with the grippers, the spacers and grippers having openings therethrough, and a helical spring threaded through the openings in the spacers and grippers and connected at its ends to form an annulus, the spring engaging the grippers adjacent the ends of the openings therethrough to exert a tilting force on the grippers urging them toward engaged position.

4. A one-way clutch adapted to connect inner and outer coaxial races comprising a series of tiltable grippers, a series of spacers arranged alternately with the grippers, the spacers and grippers having openings therethrough, and an annular spring threaded through the openings in the spacers and grippers to hold them assembled, the spacers being of maximum circumferential thickness intermediate their radial edges to engage the grippers intermediate their radial edge portions and provide pivot points about which the grippers may rock.

5. A one-way clutch adapted to connect inner and outer coaxial races comprising a series of tiltable grippers, a series of spacers arranged alternately with the grippers, the spacers and grippers having openings therethrough, and an annular spring threaded through the openings in the spacers and grippers to hold them assembled, the spacers being substantially diamond shaped in section to provide fulcrums engaging the grippers intermediate their radial edge portions about which the grippers may rock.

6. A one-way clutch adapted to connect inner and outer coaxial races comprising a series of tiltable grippers, a series of spacers arranged alternately with the grippers, the spacers and grippers having openings therethrough, and an annular spring threaded through the openings in the spacers and grippers to hold them assembled, the spacers being substantially diamond shaped in section to provide fulcrums engaging the grippers centrally of their radial width whereby forces in a circumferential direction between the spacers and grippers will not exert a tilting force on the grippers.

7. A one-way clutch adapted to connect inner and outer coaxial races comprising a series of tiltable grippers, a series of spacers arranged alternately with the grippers, the spacers and grippers having centrally located openings therethrough, and an elongated spring threaded through the openings and having its ends connected to form an annulus, at least one of the spacers having the opening therethrough formed by a slot opening at one edge thereof whereby said spacer can be assembled on the spring after its ends are connected.

8. A one-way clutch adapted to connect inner and outer coaxial races comprising a series of tiltable grippers, a series of spacers arranged alternately with the grippers, the spacers and grippers having centrally located openings therethrough, an annular spring threaded through the openings, and circumferentially extending flanges on the ends of the spacers engaging the ends of the grippers against relative turning about the spring.

9. The construction defined in claim 8 in which the flanges on adjacent spacers abut to hold the spacers spaced apart in the assembly.

10. The construction defined in claim 8 in which the flanges on the spacers are arcuate at their edges and the flanges on adjacent spacers abut to hold the spacers spaced apart a constant distance regardless of their relative angular positions.

11. A one-way clutch adapted to connect inner and outer coaxial races comprising a series of tiltable grippers, a series of spacers arranged alternately with the grippers, the spacers and grippers having centrally located openings therethrough, an annular spring threaded through the openings to hold the spacers and grippers assembled, the spacers including end portions connected by inner and outer cross bars engageable with the grippers to control tilting of the grippers as the spacers tilt.

12. A one-way clutch adapted to connect inner and outer coaxial races comprising a series of tiltable grippers, a series of spacers arranged alternately with the grippers, the spacers and grippers having centrally located openings therethrough, an annular spring threaded through the openings to hold the spacers and grippers assembled, the spacers including end portions connected by inner and outer cross bars engageable with the grippers to control tilting of the grippers as the spacers tilt, and the spacers being formed frictionally to engage the races to be tilted in response to relative rotation of the races.

13. A one-way clutch adapted to connect inner and outer coaxial races comprising a series of tiltable grippers, a series of spacers arranged alternately with the grippers, the spacers and grippers having centrally located openings therethrough, an annular spring threaded through the openings to hold the spacers and grippers assembled, the spacers including end portions connected by inner and outer cross bars engageable with the grippers to control tilting of the grippers as the spacers tilt, the spacers including resilient portions resiliently engaging the races to exert a frictional drag thereagainst.

14. A one-way clutch adapted to connect inner and outer coaxial races comprising a series of tiltable grippers, a series of spacers arranged alternately with the grippers, the spacers and grippers having centrally located openings therethrough, an annular spring threaded through the openings to hold the spacers and grippers assembled, the spacers being formed of elongated strips bent into rectangular shape to provide end portions connected by inner and outer cross bars with the ends of the strip spaced apart and so shaped that the cross bars will resiliently engage the races.

15. A one-way clutch adapted to connect inner and outer coaxial races comprising a series of tiltable grippers, a series of spacers arranged alternately with the grippers, the spacers and grippers having centrally located openings therethrough, an annular spring threaded through the openings to hold the spacers and grippers assembled, the spacers including enlarged end portions connected by inner and outer cross bars, and projecting parts on the end portions engageable with the races to limit tilting of the spacers.

16. A one-way clutch adapted to connect inner and outer coaxial races comprising a series of tiltable grippers, a series of spacers arranged alternately with the grippers, the spacers and grippers having centrally located openings therethrough, an annular spring threaded through the openings to hold the spacers and grippers assembled, the spacers including enlarged end portions connected by inner and outer cross bars, the end portions extending circumferentially beyond the cross bars to abut the end portions of adjacent spacers thereby to hold the spacers spaced apart in the assembly.

17. A one-way clutch adapted to connect inner and outer coaxial races comprising a series of tiltable grippers, a series of spacers arranged alternately with the grippers, the spacers and grippers having centrally located openings therethrough, an annular spring threaded through the openings to hold the spacers and grippers assembled, the spacers including enlarged end portions connected by inner and outer cross bars, and projecting parts on the end portions engageable with the races to limit tilting of the spacers, the end portions terminating in arcuate edges to abut the edges of adjacent spacers and hold the spacers spaced the same distance in the assembly regardless of their relative angular positions, and parts on the end portions of the spacers engageable with the races to limit tilting of the spacers.

18. A one-way clutch adapted to connect inner and outer coaxial races comprising a series of tiltable grippers, a series of spacers arranged alternately with the grippers, the grippers and spacers having aligned openings therethrough, an annular spring threaded through the openings to hold the grippers and spacers assembled, the spacers including portions engageable with the grippers adjacent the races to control tilting of the grippers as the spacers tilt, and the spacers being formed frictionally to engage the races to be tilted in response to relative rotation of the races.

ADIEL Y. DODGE.